US008554837B2

(12) United States Patent
Davi et al.

(10) Patent No.: US 8,554,837 B2
(45) Date of Patent: Oct. 8, 2013

(54) AUTOMATIC MODERATION OF MEDIA CONTENT BY A FIRST CONTENT PROVIDER BASED ON DETECTED MODERATION BY A SECOND CONTENT PROVIDER

(75) Inventors: John Christopher Davi, Palo Alto, CA (US); Glenn Thomas Millican, III, Mountain View, CA (US)

(73) Assignee: Cisco Technology, Inc., San Jose, CA (US)

( * ) Notice: Subject to any disclaimer, the term of this patent is extended or adjusted under 35 U.S.C. 154(b) by 292 days.

(21) Appl. No.: 12/567,253

(22) Filed: Sep. 25, 2009

(65) Prior Publication Data

US 2011/0078242 A1  Mar. 31, 2011

(51) Int. Cl.
G06F 15/16 (2006.01)
G06F 15/173 (2006.01)

(52) U.S. Cl.
USPC .......................... 709/204; 709/223; 709/225

(58) Field of Classification Search
USPC ....................................................... 709/204
See application file for complete search history.

(56) References Cited

U.S. PATENT DOCUMENTS

| 7,181,412 B1* | 2/2007 | Fulgoni et al. | 705/7.32 |
|---|---|---|---|
| 2002/0152163 A1* | 10/2002 | Bezos et al. | 705/40 |
| 2004/0103120 A1* | 5/2004 | Fickle et al. | 707/104.1 |
| 2005/0144641 A1* | 6/2005 | Lewis | 725/60 |
| 2007/0208755 A1* | 9/2007 | Bhatkar et al. | 707/10 |
| 2009/0055385 A1* | 2/2009 | Jeon et al. | 707/5 |
| 2009/0138922 A1* | 5/2009 | Thomas et al. | 725/87 |
| 2009/0144780 A1 | 6/2009 | Toebes | |
| 2009/0249418 A1* | 10/2009 | Alastruey Gracia et al. | 725/114 |
| 2010/0058377 A1* | 3/2010 | Grob et al. | 725/14 |
| 2010/0128664 A1* | 5/2010 | Denny et al. | 370/328 |

OTHER PUBLICATIONS

"Reference Guide: Data API Protocol"; Oct. 24, 2008; 61 pages total (pp. 10 and 18 pertinent).*
Cisco, White Paper, "Web Video: Enable a Richer Experience with Metadata", [online], 2008, [retrieved on Jun. 17, 2009]. Retrieved from the internet: <URL: http://www.cisco.com/web/solutions/cmsg/C11-484490-00_Metadata_wp.pdf>, pp. 1-4.
Cisco, White Paper, "Socially Collaborative Filtering: Give Users Relevant Content", [online], 2008, [retrieved on Jun. 17, 2009]. Retrieved from the internet: <URL: http://www.cisco.com/web/solutions/cmsg/C11-484492-00_Filtering_wp.pdf>, pp. 1-10.

(Continued)

Primary Examiner — Richard G Keehn
(74) Attorney, Agent, or Firm — Leon R. Turkevich (57) ABSTRACT In one embodiment, a method comprises registering content providers, each content provider having a corresponding independent moderation policy configured for selectively providing network access to a media content item supplied by a user; receiving, from a first of the content providers, a first notification that a first media content item has been moderated by the first content provider; and sending a second notification to at least a second of the content providers, the second notification identifying that the first content provider has moderated the first media content item, the second notification enabling the second content provider to moderate the first media content item based on the second notification and according to the corresponding independent moderation policy of the second content provider.

22 Claims, 9 Drawing Sheets

(56) References Cited

OTHER PUBLICATIONS

Collaboration.wikia.com, "Collaborative moderation", [online], [retrieved on Jul. 1, 2009]. Retrieved from the internet: <URL: http://collaboration.wikia.com/wiki/Collaborative_moderation>, one page.

Peerworks, "Collaborative moderation", [online], [retrieved on Jul. 1, 2009]. Retrieved from the internet: <URL: http://www.peerworks.org/story/collaborative_moderation.html>, pp. 1-3.

Cisco Eos(TM) Administration Guide, V. 1.6, Apr. 2009, pp. 1-60.

Cisco, "New Web Applications Require a New Approach: Cisco Eos", [online], [retrieved on Aug. 4, 2009]. Retrieved from the internet: <URL: http://cisco.com/web/solutions/cmsg/eos_architecture_ds.pdf>, pp. 1-4.

Cisco, "Cisco Eos: Delivering a Community-driven Entertainment Experience", [online], [retrieved on Jun. 17, 2009]. Retrieved from the internet: <URL: http://www.cisco.com/web/solutions/cmsg/eos_community_ds.pdf>, pp. 1-4.

Cisco, "Identity vs Reputation", [online], [retrieved on Jun. 17, 2009]. Retrieved from the internet: <URL: http://www.cisco.com/web/solutions/cmsg/identity_wp.pdf>, pp. 1-6.

Keibi, "The Keibi Moderation Suite", [online], [retrieved on Jul. 1, 2009]. Retrieved from the internet: <URL: http://www.keibitech.com/automated-ugc-moderation-software-solutions/keibi-moderation-suite-product>, one page.

P2P Foundation, "Collaborative Moderation", [online], Mar. 23, 2007, [retrieved on Jul. 1, 2009]. Retrieved from the internet: <URL: http://p2pfoundation.net/Collaborative_Moderation?title=Collaborative_Moderation&printable=yes>, one page.

\* cited by examiner

Notification Message from Content Provider YouTube™, 28

| From: YouTube™ Collborative Moderation | Action: Blocked | Reason: Offensive-Violent |
|---|---|---|
| Media Content Metadata: | | |
| Media Content ID = ID_1 | Media Type = Video | Media Title = Favorite Torture Techniques |
| Video Media URL = www.youtube.com/blocked/id=wz467/login_auth=? | | |
| Video Thumbnail URLs = www.youtube.com/blocked/id=wz467/thumb=1/login_auth=? | | |
| www.youtube.com/blocked/id=wz467/thumb=2/login_auth=? | | |
| www.youtube.com/blocked/id=wz467/thumb=3/login_auth=? | | |
| Video Length = 185 seconds | Video Size = 6204587 bytes | ... |
| Original Uploaded Filename = torture.avi | Uploading Username = jsmith123 | |
| Uploading IP Address = "A" | | |
| Optional Attachment: Copy of media content item  66 | | |

Figure 4A

Moderation Notification Message from Moderation Server, 32

| Moderation by: YouTube™ Collaborative Moderation | Action: Blocked | Reason: Offensive-Violent |
|---|---|---|
| Moderation by: Facebook™ Administrator | Action: Blocked | Reason: Recommendation Accepted (Offensive-Violent Content) |
| Recommendation: Auto-Block | | |
| Media Content Metadata: | | |
| Media Content ID=ID 1 | Media Type = Video | Media Title = Favorite Torture Techniques |
| Video Length = 185 seconds | | Video Size = 6204587 bytes |
| Original Uploaded Filename=torture.avi | | Uploading Username=jsmith123 |
| Uploading IP Address = "A" | | ... |

AUTOMATIC MODERATION OF MEDIA CONTENT BY A FIRST CONTENT PROVIDER BASED ON DETECTED MODERATION BY A SECOND CONTENT PROVIDER

TECHNICAL FIELD

The present disclosure generally relates to moderation by a content provider of media content items (e.g., image files, audio clips, video clips, text files, etc.) that are supplied by users of the content provider. An example content provider can be a website service that enables registered users to upload media content items via a wide area network such as the Internet.

BACKGROUND

A content provider in a wide area network such as the Internet can permit registered users to upload media content items for distribution to other registered users accessing the content provider. Example content providers can include social network websites (e.g., YouTube™, Facebook™, etc.), or bulletin board websites that enable registered users to post online messages. Content providers, however, can establish policies that prohibit posting "inappropriate content", defined in the policies for example based on copyright permissions, age-appropriate content (e.g., no pornographic material), no hateful or offensive material, etc. Hence, any media content item that is deemed inappropriate by the content provider can be deleted by one or more persons assigned as "moderators" by the content provider. Inappropriate content can be detected via different techniques: manual inspection of a media content item by a moderator prior to distribution suffers from the disadvantage of not being scaleable because the amount of uploaded content can quickly overwhelm moderator capacity; collaborative moderation enables users of a website to collectively determine whether content is inappropriate based on a prescribed minimum number of users rating or "flagging" content as inappropriate.

Content providers also can delegate their moderation responsibilities to a moderation firm: the moderation firm retains sole and exclusive responsibility for moderating content on behalf of these content providers. Example moderation firms include Caleris, Inc. (available at the website address "caleris.com") and eModeration, Inc. (available at the website address "emoderation.com").

BRIEF DESCRIPTION OF THE DRAWINGS

Reference is made to the attached drawings, wherein elements having the same reference numeral designations represent like elements throughout and wherein.

DESCRIPTION OF EXAMPLE EMBODIMENTS

Overview

In one embodiment, a method comprises registering content providers, each content provider having a corresponding independent moderation policy configured for selectively providing network access to a media content item supplied by a user; receiving, from a first of the content providers, a first notification that a first media content item has been moderated by the first content provider; and sending a second notification to at least a second of the content providers, the second notification identifying that the first content provider has moderated the first media content item, the second notification enabling the second content provider to moderate the first media content item based on the second notification and according to the corresponding independent moderation policy of the second content provider.

In another embodiment, an apparatus comprises a processor circuit and a network interface circuit. The processor circuit is configured for registering content providers into a database. Each content provider has a corresponding independent moderation policy configured for selectively providing network access to a media content item supplied by a user. The network interface circuit is configured for receiving, from a first of the content providers via an Internet Protocol (IP) network, a first notification that a first media content item has been moderated by the first content provider. The processor circuit also is configured for generating a second notification for transmission by the network interface circuit to at least a second of the content providers. The second notification identifies that the first content provider has moderated the first media content item. The second notification enables the second content provider to moderate the first media content item based on the second notification and according to the corresponding independent moderation policy of the second content provider.

Detailed Description

Particular embodiments enable content providers (e.g., web site services) to share moderation decisions regarding the same or similar media content items. The moderation decisions can be shared based on a notification from a first of the content providers having moderated a given media content item (also referred to herein as an "originating content provider"), based on the originating content provider having executed a moderation decision according to a corresponding independent moderation policy. The independent moderation policy can include manual action by an administrator, or collaborative moderation by authorized users of the originating content provider. The moderation of a given media content item can include any one of blocking access (i.e, removing access) to a media content item, restricting access of the media content item to authorized users (e.g., based on age verification or agreement to view content considered offensive, etc.), or granting approval for unlimited access to the media content item.

The notification from the originating content provider can be received by a moderation server. The moderation server can output to at least a second content provider (also referred to herein as a "destination content provider") a notification identifying that the originating content provider has moderated the given media content item. The moderation server also can specify within the notification to the second content provider a recommendation as to how the given media content item should be moderated, based on the respective independent moderation policies of the originating content provider and the destination content provider.

Hence, a content provider can moderate access to a given media content item according to its independent moderation policy, and based on notification that another content provider has already moderated the same or similar media content item. Hence, a content provider can utilize the moderation decisions of other content providers, enabling the same content to be automatically moderated by the content provider. The example embodiments illustrated herein can be particularly effective for blocking or restricting the attempted distribution of the media content item by the same user at the different content providers.

Figure 1:
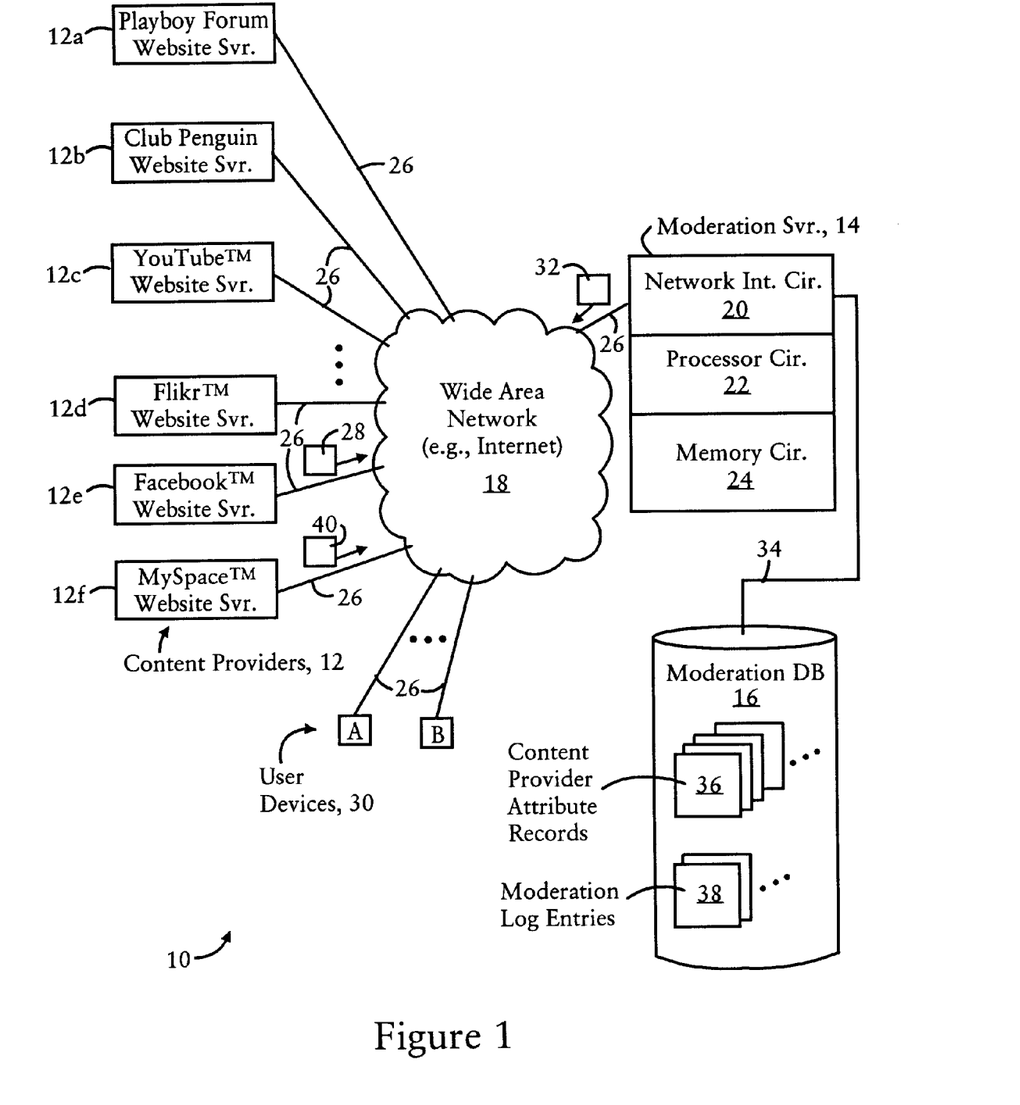
FIG. 1 illustrates an example system having an apparatus for sharing moderation decisions between distinct content providers, according to an example embodiment.

FIG. 1 illustrates an example system 10 for providing automatic moderation of media content based on detected moderation by a content provider, according to an example embodiment. The system 10 includes at least two content providers 12, illustrated as website servers. The system 10 also includes at least one moderation server 14 and a moderation database (DB) 16. The moderation server 14 is implemented as at least one physical machine (i.e., hardware device) configured for implementing network communications with other physical machines (e.g., any one of the content providers 12) via a physical network having multiple physical communication links, for example a wide-area network 18. The moderation server 14 also can be implemented using multiple physical machines (e.g., multiple computing devices) in a distributed server environment. An example implementation of the moderation server 14 includes the commercially available Cisco Eos™ platform from Cisco Systems, San Jose Calif., modified as described herein. An example of the wide-area network 18 is an Internet Protocol (IP) based network such as the Internet.

FIG. 1 illustrates the content providers 12a, 12b, 12c, 12d, 12e, and 12f, each of which is illustrated as a website server having a corresponding independent moderation policy for determining how to moderate media content items uploaded by users of user devices 30. A user device 30 can be implemented, for example, as a microprocessor-based personal computer, laptop computer, web-enabled mobile device (e.g. cell phone, smartphone such as an Apple iPhone), etc, The term "content provider" as used herein refers to a Internet Protocol (IP) network-based entity (e.g., website service, messaging service, etc.) that has its own corresponding set of registered users, and that has its own independent moderation policy for selectively providing network access to a media content item supplied by one of the registered users. Hence, if an individual user (A) of one of the user devices 30 wants to subscribe to the services of the separate and distinct content providers 12c and 12d, the individual user must complete separate and distinct registrations with each of the content providers 12c and 12d. Since the content providers 12c and 12d are distinct from each other, the individual user (A) could use either the same user name (e.g., user A subscribes to the content provider 12c as "John123" and content provider 12d as "John123") or a different user name, depending on the user name availability of the content providers 12c and 12d.

The moderation server 14 includes a network interface circuit 20, a processor circuit 22, and a memory circuit 24. Any of the disclosed circuits 20, 22, and 24 of the moderation server 14 can be implemented in multiple forms. Example implementations of the disclosed circuits include hardware logic that is implemented in a logic array such as a programmable logic array (PLA), a field programmable gate array (FPGA), or by mask programming of integrated circuits such as an application-specific integrated circuit (ASIC). The processor circuit 22 can be implemented using a multi-processor system (e.g., having multiple central processing units (CPUs) operating in parallel within a single computer system), or a single CPU. Any of these circuits also can be implemented using a software-based executable resource that is executed by a corresponding internal processor circuit such as a microprocessor circuit (not shown), where execution of executable code stored in an internal memory circuit (e.g., within the memory circuit 24) causes the processor circuit to store application state variables in processor memory, creating an executable application resource (e.g., an application instance) that performs the operations of the circuit as described herein. Hence, use of the term "circuit" in this specification refers to both a hardware-based circuit that includes logic for performing the described operations, or a software-based circuit that includes a reserved portion of processor memory for storage of application state data and application variables that are modified by execution of the executable code by a processor circuit. The memory circuit 24 can be implemented, for example, using a non-volatile memory such as a programmable read only memory (PROM) or an EPROM, and/or a volatile memory such as a DRAM, etc.

Further, any reference to "outputting a message" (or the like) can be implemented based on creating the message in the form of a data structure and storing that data structure in a tangible memory medium in the disclosed apparatus (e.g., in a transmit buffer). Any reference to "outputting a message" (or the like) also can include electrically transmitting (e.g., via wired electric current or wireless electric field, as appropriate) the message stored in the tangible memory medium to another network node via a communications medium (e.g., a wired or wireless link, as appropriate) (optical transmission also can be used, as appropriate). Similarly, any reference to "receiving a message" (or the like) can be implemented based on the disclosed apparatus detecting the electrical (or optical) transmission of the message on the communications medium, and storing the detected transmission as a data structure in a tangible memory medium in the disclosed apparatus (e.g., in a receive buffer). Also note that the memory circuit 24 can be implemented dynamically by the processor circuit 22, for example based on memory address assignment and partitioning executed by the processor circuit 22.

The network interface circuit 20 is configured for establishing a physical communication link 26 with the wide-area network 18 using associated network machines (e.g., link layer switches such as Ethernet switches, network layer routers such as Internet Protocol (IP) routers, firewall devices, etc.). Hence, the network interface circuit 20 can be configured for receiving, via the wide area network 18, a notification message 28 or a query message 40 from a content provider (e.g., 12e). The notification message 28 from an originating content provider (e.g., 12e) also can be referred to as a provider-initiated notification message.

Each content provider 12 can be configured, according to its corresponding independent moderation policy, to output a notification message 28 and/or a query message 40 in response to a corresponding registered user having supplied the media content item. For example, a content provider 12 can be configured for sending a notification message 28 to the moderation server 14 only if the media content item supplied by the registered user is blocked (i.e., access is removed) by the content provider 12; alternately, the content provider 12 can be configured for sending a notification message 28 for each moderation decision (e.g., a favorable decision granting unlimited access, an unfavorable decision restricting or blocking access) related to the media content item. Each content provider 12 also can be configured for sending a query 40 to determine whether a media content item has been previously moderated, and also for sending a notification message 28 in response to subsequent moderation, for example based on a recommendation specified in a notification message 32 from the moderation server, the notification message 28 specifying whether the recommendation was followed or whether an alternate moderation decision was executed. The content provider also can be configured for outputting update notifications 28 if the moderation status of a given media content item has changed.

The network interface circuit 20 of the moderation server 14 also can be configured for outputting a moderation server-initiated notification message. The network interface circuit 20 also is configured for providing a data connection 34 to the moderation database 16. The processor circuit 22 also can be configured for generating the moderation server-initiated notification message 32 based on the provider-initiated notification message 28 and content provider attribute records 36 stored in the moderation database 16: the moderation server-initiated notification message 32 can be generated for example in response to detecting that another content provider (e.g., 12c) has subscribed to monitor moderation activities of the originating content provider 12e, described in further detail below with respect to FIG. 2A and FIG. 5A; the moderation server-initiated notification message 32 also can be generated for example in response to receiving a query message 40 from one of the content providers (e.g., 12f), described in further detail below with respect to FIG. 2A and FIG. 5B.

Figure 2A:
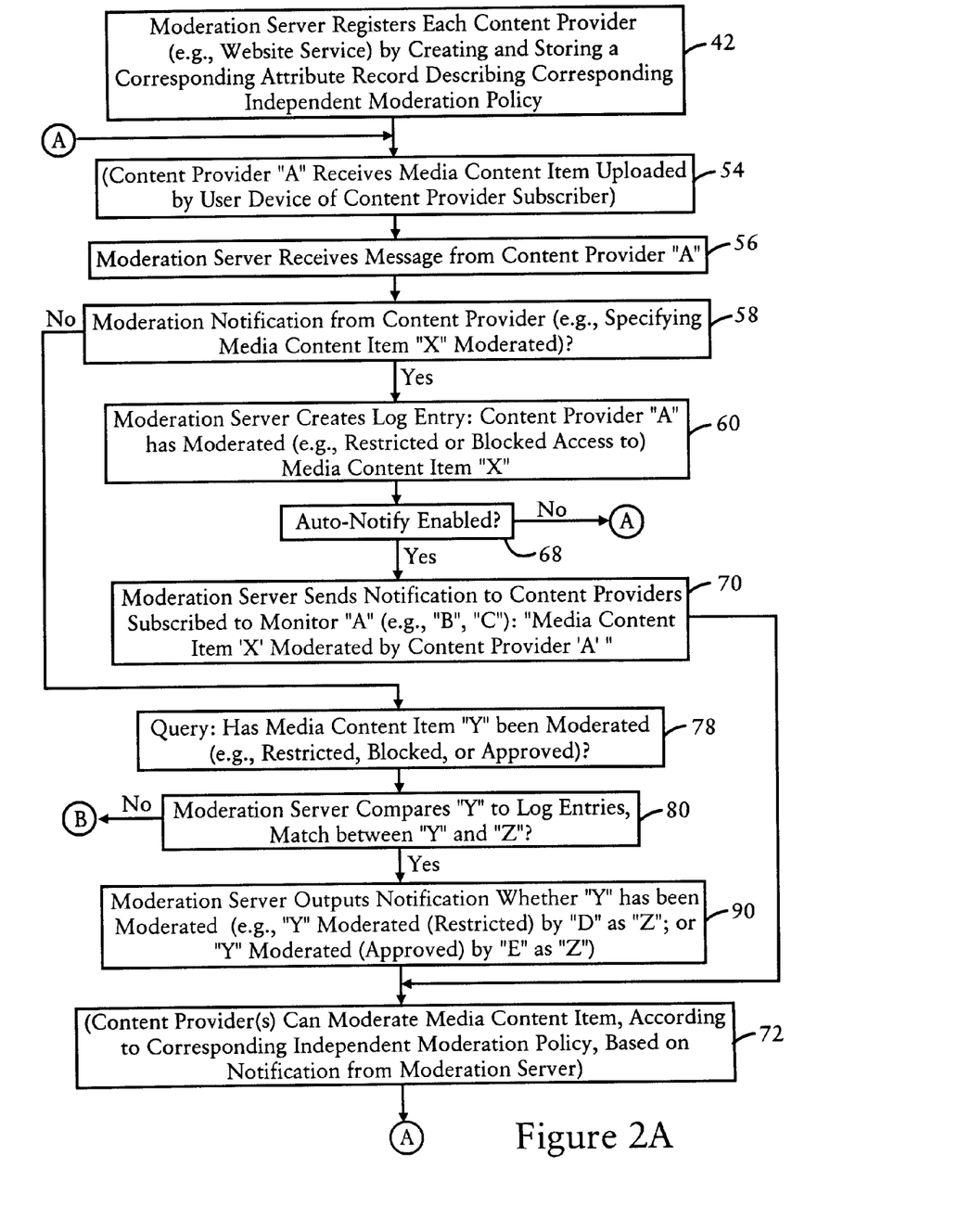
FIGS. 2A and 2B illustrate an example method by the apparatus of FIG. 1 of sharing moderation decisions, according to an example embodiment.
Figure 2B:
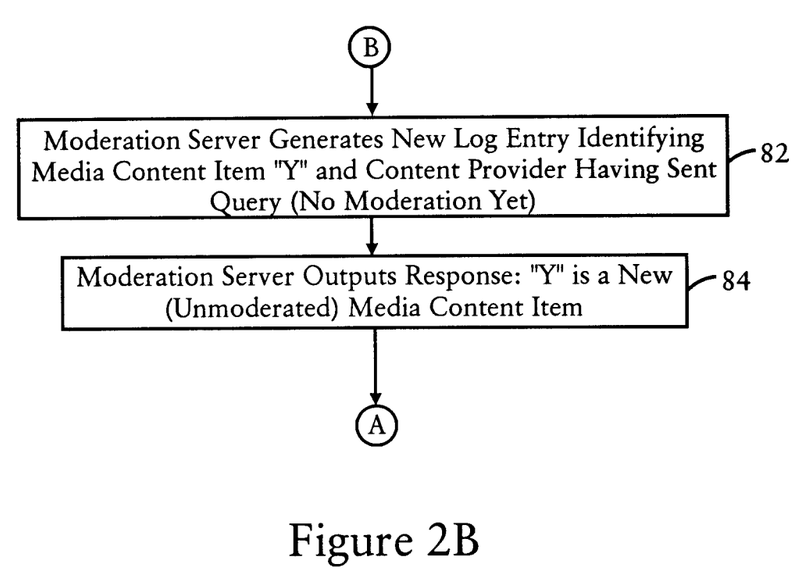

FIGS. 2A and 2B illustrate an example method by the apparatus 14 (i.e., the moderation server 14) of FIG. 1 of sharing moderation decisions by the content providers 12, according to an example embodiment. The steps described in FIGS. 2A and 2B can be implemented as executable code stored on a computer or machine readable storage medium (e.g., floppy disk, hard disk, ROM, EEPROM, nonvolatile RAM, CD-ROM, etc.) that are completed based on execution of the code by a processor circuit (e.g., a CPU or a multiprocessor system); the steps described herein also can be implemented as executable logic that is encoded in one or more tangible media for execution (e.g., programmable logic arrays or devices, field programmable gate arrays, programmable array logic, application specific integrated circuits, etc.).

Referring to FIG. 2A, the processor circuit 22 of the moderation server 14 can be configured for registering in step 42 each of the content providers 12 based on storing a content provider attribute record 36 for each content provider 12 into the moderation database 34. For example, the processor circuit 22 and the content providers 12 can be configured for executing selected operations of the above-identified Cisco Eos™ platform, enabling the moderation server 14 to communicate with each of the content providers 12 according to a prescribed messaging protocol (e.g., a "public services layer" or Application Programming Interface (API)), where either the moderation server 14 or the corresponding content provider 12 can initiate the registration process. The processor circuit 22 also can be configured for storing the corresponding content provider attribute record 36 in the moderation database 16 according to a prescribed database record storage protocol, for example the commercially available MySQL, PHP, Java Tomcat, or Oracle Database. The content provider attribute record 36 stored for the corresponding content provider 12 also can describe the corresponding independent moderation policy 44 for the corresponding content provider 12, described below with respect to FIGS. 3A and 3B.

Figure 3A:
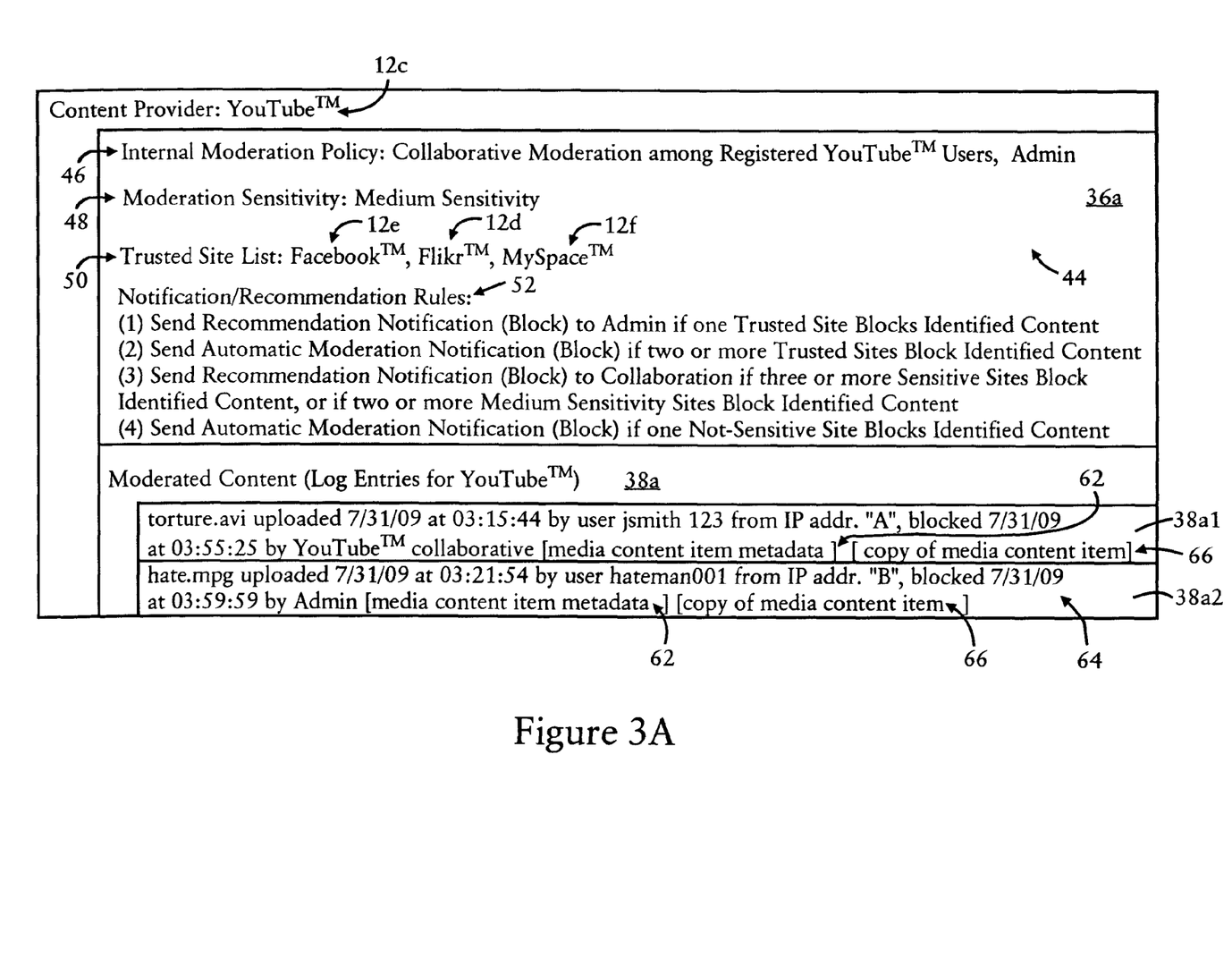
FIGS. 3A and 3B illustrate example data structures stored in the moderation log of FIG. 1, according to an example embodiment.
Figure 3B:
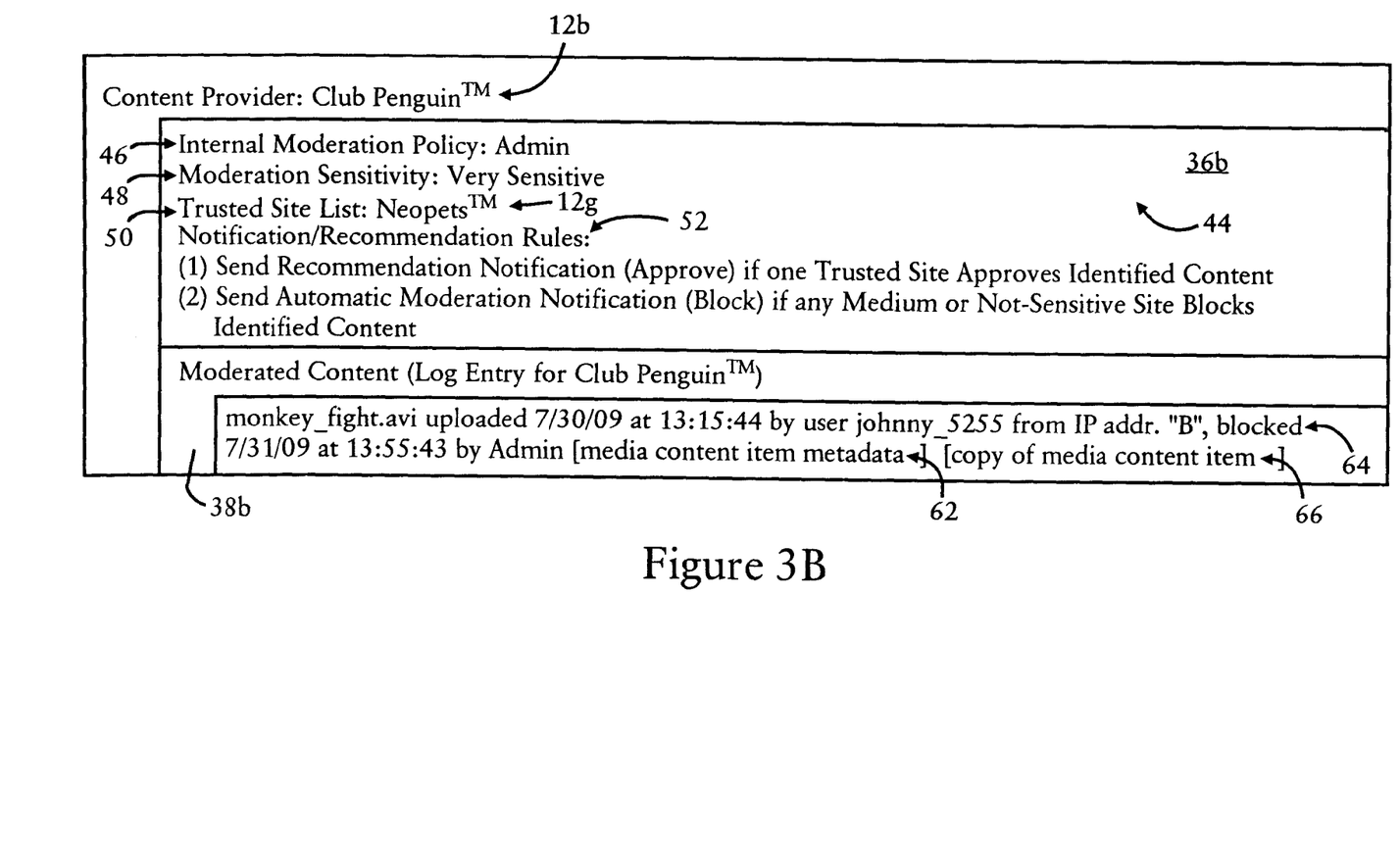

FIGS. 3A and 3B illustrates example content provider attribute records 36 (e.g., 36a and 36b), according to an example embodiment. Each of the content provider attribute records 36 can describe the corresponding independent moderation policy 44 for the corresponding content provider 12. For example, each independent moderation policy 44 can include an internal moderation policy implementation attribute 46, a moderation sensitivity attribute 48, a trusted site list 50, and one or more notification-recommendation rules 52.

The internal moderation policy implementation attribute 46 can specify the manner in which moderation decisions are executed with respect to new media content items, supplied by any registered users of the corresponding content provider 12, for which there is no prior moderation decision. For example, the internal moderation policy implementation attribute 46 for the content provider attribute record 36a of FIG. 3A specifies that the content provider 12c can execute moderation decisions based on any one of collaborative moderation among registered users, or based on manual control by an authorized administrator (e.g., a moderator). In contrast, the internal moderation policy implementation attribute 46 for the content provider attribute record 36b of FIG. 3B specifies that the content provider 12b requires an authorized administrator (e.g., a moderator) to moderate all new media content items supplied by registered users of the corresponding content provider 12b. Hence, the internal moderation policy implementation attribute 46 illustrates that the content provider 12c implements a more flexible independent moderation policy that permits collaborative moderation between registered users, whereas the content provider 12b implements a more restrictive independent moderation policy.

The moderation sensitivity attribute 48 can identify the relative sensitivity of the targeted registered users with respect to media content items. For example, the content provider 12a of FIG. 1 may establish a relatively low sensitivity 48 based on providing adult-related content for adult entertainment: such a relatively low sensitivity 48 may be deemed appropriate by the administrator of the content provider 12a based on the content provider 12a requiring substantially restrictive requirements for user registration (e.g., user must verify he or she is over 21 years old, user must provide credit card authorization and verification, etc.). In contrast, the content provider 12b may establish a relatively high level of sensitivity 48 (illustrated in FIG. 3B as "Very Sensitive") based on providing media content items that must be appropriate for children ages 6-12 having registered with parental permission, where the content provider 12b has guaranteed that only age-appropriate content will be supplied to the registered users. The content provider 12c may establish a moderate level of sensitivity 48 (illustrated in FIG. 3A as "Medium Sensitivity") for a broader consumer market based on requiring users during registration to confirm that they are at least 16 years of age. As described in further detail below, the processor circuit 22 can generate recommendations for the content providers 12 based on comparing the moderation sensitivity 48 of different content providers 12.

The trusted site list 50 can specify other content providers 12 that are trusted by the administrator of the corresponding content provider 12. For example, the independent operation policy 44 for the content provider 12c specifies in the corresponding trusted site list 50 that the content providers 12d, 12e, and 12f are trusted by the administrator of the content provider 12c; the independent moderation policy 44 for the content provider 12b specifies in the corresponding trusted site list 50 another children-targeted content provider ("Neopets™") 12g is trusted by the administrator of the content provider 12b. Hence, the processor circuit 22 can generate automatic recommendations for content providers 12, enabling a content provider (e.g., 12b) to automatically moderate a media content item based on the moderation decision of another content provider listed in the corresponding trusted site list 50. Other attributes can be specified within the independent moderation policy 44, for example accepted media types (e.g., audio, video, photos, etc.), permissible or impermissible subject matter or bias in order to further limit content to media content items that are relevant or desirable by the registered users.

The notification-recommendation rules 52 can specify rules that are established by the administrator of the corresponding content provider 12, enabling the processor circuit 22 determine the type of notification that should be sent to the corresponding content provider. For example, one of the notification-recommendation rules 52 for the content provider 12c can specify that the processor circuit 22 should generate and send to the content provider 12c a moderation server-initiated notification message 32 specifying a moderation recommendation for the content provider 12c, namely block access (i.e., remove access) to a specified media content item if one trusted site blocks the identified media content item, enabling the corresponding administrator to moderate the specified media content item based on following the moderation decision of the trusted site. Another of the notification-recommendation rules 52 can specify the processor circuit 22 should specify within the message 32 a recommendation for automatic moderation, enabling the content provider 12c to automatically moderate (i.e., without the necessity of any involvement by the corresponding administrator) the specified media content item. As illustrated in FIG. 3A with respect to the notification-recommendation rules 52 of the content provider 12c, the processor circuit 22 can generate different moderation recommendations, for example a recommendation notification to block, or an automatic moderation notification to block, based on the number and/or the respective moderation sensitivities of content providers 12 having previously generated the moderation decision, and based on whether those content providers 12 are trusted sites. Since the content provider 12b has a relatively high level of sensitivity 48 due to the registered users being children ages 6-12, the corresponding notification-recommendation rules 52 illustrated in FIG. 3B can cause the processor circuit 22 to send a notification 32 recommending automatic moderation by blocking the identified media content item if any medium or non-sensitive site blocks the identified media content item; similarly, the notification-recommendation rules 52 for the content provider 12b can cause the processor circuit 22 to specify in the notification 32 a moderation recommendation for the administrator of the content provider 12b to allow (i.e., approve) access to the specified media content item if one trusted site (identified in the corresponding trusted site list 50) approves the identified content.

Hence, the moderation recommendation generated by the processor circuit 22 and specified in the moderation server-initiated notification message 32 destined for a given content provider (e.g., 12c) can be based on the respective independent moderation policies executed by other content providers (e.g., 12d, 12e, and 12f) for the same or similar media content item.

Although a content provider (e.g., 12c) can automatically execute moderation decisions based on moderation decisions of other content providers 12 (e.g., based on corresponding notification rules 52 following moderation decisions of content providers 12 specified in a trusted site list 50), the corresponding moderation policy for each content provider 12 is "independent" because the moderation policy cannot be controlled by any other content provider 12 or the moderation server 14. Hence, each content provider 12 maintains final control over its own independent moderation policy.

FIGS. 3A and 3B also illustrate moderation log entries 38 (e.g., 38a and 38b) stored by the processor circuit 22 in response to receiving a provider-initiated notification message 28 specifying a notification that a specified media content item has been moderated by the originating content provider 12. The moderation log entries 38 (e.g., 38a and 38b) for the respective content providers 12 also can be stored with the respective content provider attribute records 36 (i.e., indexed based on the content provider 12 having moderated the content), alternately the moderation log entries 38 can be stored separately, for example indexed according to a prescribed identifier of the media content item (e.g., a unique media content item identifier, media content item name, etc.); other indexing schemes can be used for the moderation log entries 38. The moderation log entries 38 (e.g., 38a1, 38a2, and 38b) include attributes 62 and 64, described below with respect to FIG. 4A. Each entry 38 also can store a copy of the moderated media content item 66.

Referring again to FIG. 2A, assume in step 54 that one of the content providers "A" (e.g., 12c) receives a media content item that is supplied (i.e., uploaded) by a registered user via one of the user devices 30 of FIG. 1. In response to the content provider 12c receiving the media content item from the registered user, the content provider 12c can send a message 28 or 40 the moderation server 14, via the wide-area network 18, which is received by the network interface circuit 20 via the corresponding data link 26 in step 56 and forwarded to the processor circuit 22.

The processor circuit 22 determines in step 58 whether the received message is a provider-initiated moderation notification message 28 from an originating content provider 12, or a query message 40. If the processor circuit 22 determines in step 58 that the received message is a provider-initiated moderation notification message 28 from the originating content provider (e.g., 12c) specifying that a specific media content item (e.g., "X") has been moderated, the processor circuit 22 can create in step 60 a moderation log entry 38 specifying that the content provider "A" has moderated an identified media content item. The processor circuit stores in step 60 the corresponding moderation log entry 38 in the moderation database 16.

Figure 4A:
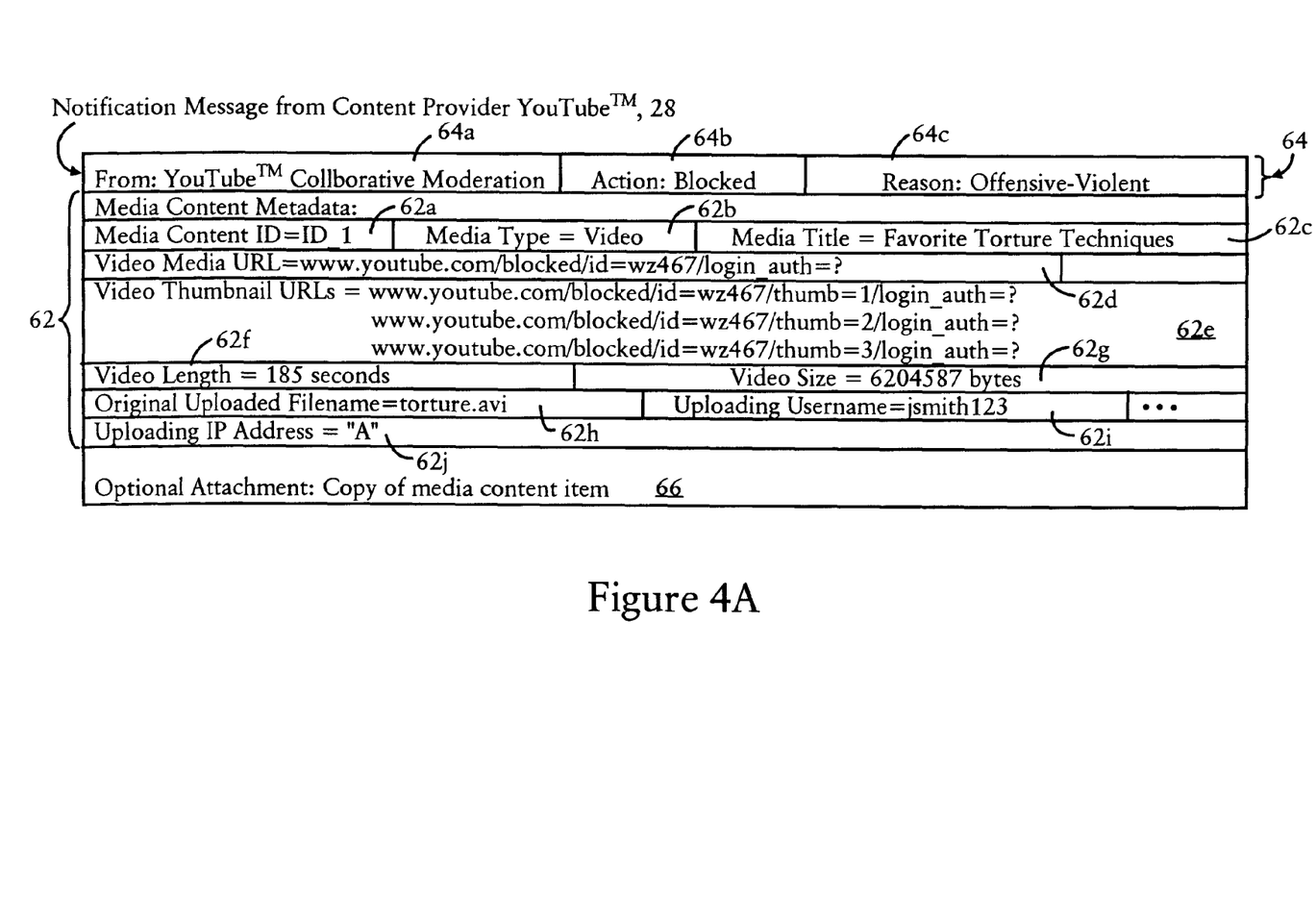
FIGS. 4A and 4B illustrate respective example notification messages received and sent by the apparatus of FIG. 1 and describing moderation decisions, according to an example embodiment.

FIG. 4A illustrates an example provider-initiated notification message 28 generated by the originating content provider 12c with respect to a media content item 66, according to an example embodiment. A copy of the moderated media content item 66 can be attached to the notification message 28 for storage in the moderation database 16 and subsequent analysis by the processor circuit 22 in identifying matches with other media content items.

The provider-initiated notification message 28 can include media content metadata 62 describing the media content item 66, and moderation metadata 64 describing the corresponding moderation action executed by the originating content provider 12c. For example, the provider-initiated notification message 28 can specify an originating moderator field 64a identifying the moderator having moderated the corresponding media content item 66, illustrated as the collaborative moderation element of the originating content provider 12c ("YouTube™ Collaborative Moderation"). The moderation metadata 64 also includes an action field 64b specifying the moderation decision that was executed by the moderator specified in the originating moderator field 64a, for example blocking, restricting, or allowing access to the corresponding media content item 66. The moderation metadata 64 also can specify a moderation reason field 64c specifying the reason that the moderation decision was executed, for example the corresponding media content item 66 was deemed offensive or violent.

Additional information may be specified in the moderation metadata 64 that enables the processor circuit 22 to determine whether a destination content provider 12 should receive a notification message 32 regarding the media content item 66, and/or determine the type of moderation recommendation that should be specified in the notification message 32 for the destination content provider. In addition, multi-tiered moderation decisions can be employed by each of the content providers 12 and the moderation server 14, for example, restricting content based on multi-tiered user classification, e.g., children tier, teenager tier, general public tier, adult tier, restricted adult tier, etc.

The media content metadata 62 can specify multiple fields that enable the processor circuit 22 to compare the moderated media content item 66 with other media content items to determine whether there is a match indicating the same or similar media content item. For example, the media content metadata 62 can include a media content identifier field 62a specifying a unique identifier (e.g., "ID_1") that uniquely identifies the moderated media content item 66 within the system 10. For example, the originating content provider 12c can be configured for choosing the unique identifier from a prescribed range of identifiers assigned to the originating content provider 12c. The media content metadata 62 also can include: a media type field 62b specifying the media type (e.g., audio, video, image, etc.); a media title field 62c specifying a title assigned to the media content item 66; a location field 62d identifying an addressable location of the media content item 66; a thumbnail location field 62e specifying one or more addressable locations of sample portions of the media content item 66 (e.g., thumbnail images for video files, short-duration audio or video clips for audio or video files, etc.); a length field 62f specifying the relative length or size of the media content item 66 (e.g., duration in seconds for audio or video files, x-y pixel dimensions for image files, etc.); a data size field 62g specifying the data size of the media content item 66; and a filename field 62 specifying the original filename of the media content item 66 as uploaded from the user device 30.

The media content metadata 62 also can include information about the registered user that supplied the moderated media content item 66, for example a user name field 62i specifying the user name of the registered user having supplied the moderated media content item 66; and a user device address field 62j specifying the device address (e.g., Media Access Control (MAC) address) and/or network address (e.g., IP address) of the user device 30 used to supply the moderated media content item 66 to the originating content provider 12c.

Hence, the processor circuit 22 can utilize the media content metadata 62 to determine whether the moderated media content item 66 matches another media content item, described in further detail below. Use of the user name 62i can be applicable in the event that a user tends to use the same registered user name for different content providers 12; use of the user device address field 62j can be applicable if the same user device 30 (or same network location) is used to upload the same or similar media content items 2 different content providers: hence, the processor circuit 22 can identify if the same user, the same user device, and/or the same network location is used to supply media content items to different content providers 12.

Referring to FIG. 2A, the processor circuit 22 creates in step 60 the moderation log entry 38 in response to receiving the moderation notification message 28. As illustrated in FIGS. 3A and 3B, the moderation log entry 38 (e.g., 38a1, 38a2, or 38b) can specify the media content item metadata 62, the moderation metadata 64, and optionally a copy of the media content item 66 supplied in the provider-initiated notification message 28.

The processor circuit 22 determines in step 68 whether any of the content providers 12 have enabled auto-notification, for example based on the processor circuit 22 parsing the content provider attribute records 36, or based on a separate data structure identifying content providers 12 that have requested auto notification. Assuming the processor circuit 22 determines in step 68 that the moderation database 16 includes at least one data structure identifying one or more of the content providers 12 have requested auto-notification, the processor circuit 22 generates and sends in step 70 a notification message 32 to the content providers 12 (e.g., "B", "C") having subscribed to monitor the moderation decisions of the originating content provider (e.g., "A").

Figure 6:
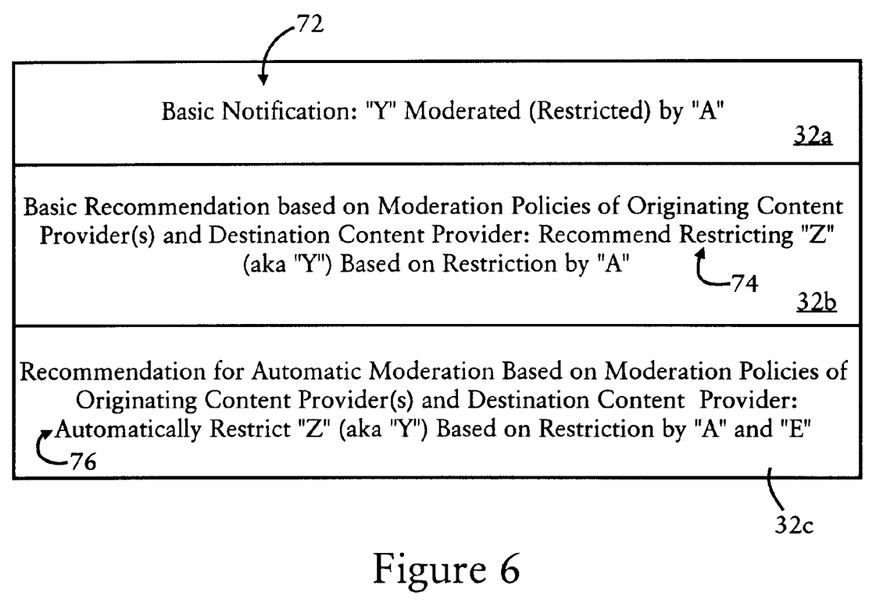
FIG. 6 illustrates example notification types generated by the apparatus of FIG. 1, according to an example embodiment.

FIG. 6 illustrates example types of moderation notification messages 32 that can be generated by the processor circuit 22. The processor circuit 22 can generate a moderation notification message 32a specifying a notification that the media content item "Y" 66 (also known by the identifier "Z") was moderated (e.g., restricted, blocked, or approved) by the content provider "A"; the processor circuit 22 also can generate a moderation notification message 32b specifying a moderation recommendation 74 recommending moderating, for example restricting (or blocking or approving) the media content item "Z" 66 (also known by the identifier "Y") based on the restriction (or blocking or approving) by the content provider "A"; the processor circuit 22 also can generate a moderation recommendation 76 recommending automatic moderation (e.g., restriction) of the media content item "Z" (also known by the identifier "Y") based on the restriction by the content providers "A" and "E". As apparent from the foregoing, the content providers "A" and "E" are assumed to have previously output respective provider-initiated notification messages 28 to the moderation server 14, causing the moderation server to add respective moderation log entries 38 that "A" and "E" each have restricted the media content item "Z" (also known by the identifier "Y") (steps 56, 58, and 60 of FIG. 2A).

Figure 4B:
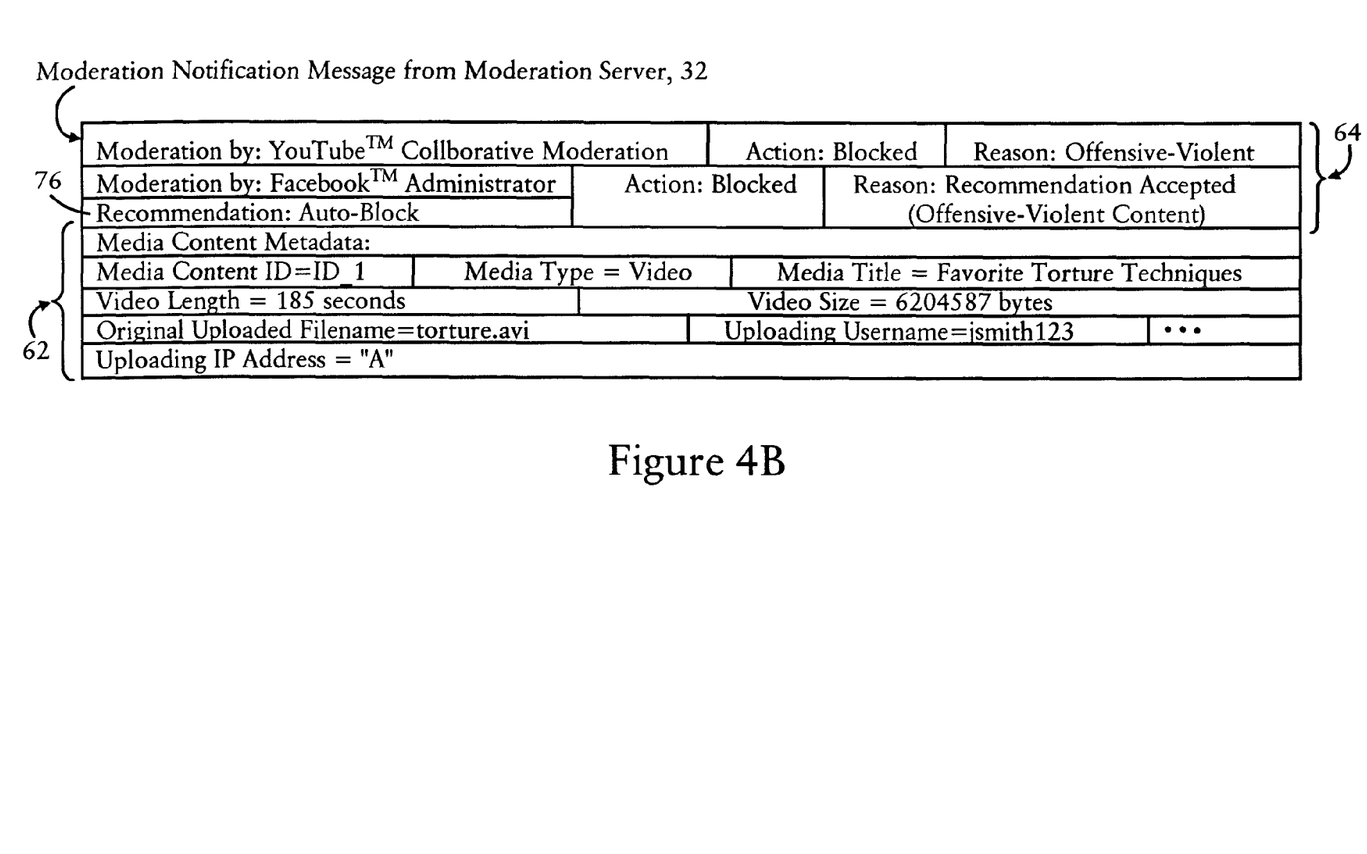

FIG. 4B illustrates in further detail an example moderation server-initiated notification message 32, including a moderation notification 72 or recommendation 74/76, the moderation metadata 64 from the moderation log entry (or entries) 38 identifying the one or more originating content providers 12 having moderated the corresponding media content item 66, and the corresponding media content metadata 62. As described previously, the processor circuit 22 can generate the appropriate moderation notification 72 or recommendation 74/76 based on comparing the respective independent moderation policies 44 for the originating content providers 12 relative to the independent moderation policy 44 of the destination content provider 12. The comparison of the respective independent moderation policies 44 by the processor circuit 22 in generating the appropriate moderation notification 72 or recommendation 74/76 can be based on any one of the moderation sensitivity 48 of the respective content providers 12, the rules 52 and/or trusted site list 50 of the destination content provider, as well as the moderation metadata 64 from the moderation log entries of the originating content providers.

Figure 5A:
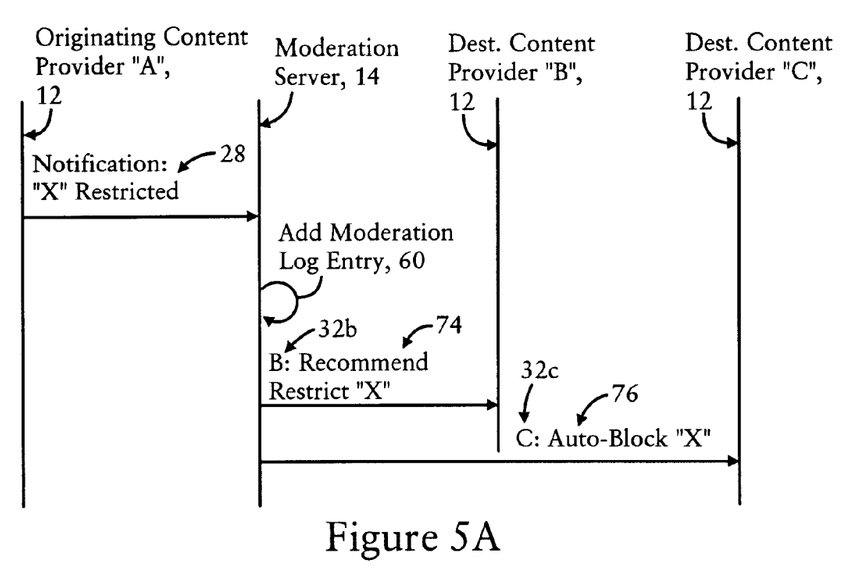
FIGS. 5A and 5B illustrate example notification methods by the apparatus of FIG. 1, according to example embodiments.

As illustrated in FIG. 5A, the content providers "B" and "C" receive respective moderation notifications 32b and 32c, where the moderation notification 32b can include a moderation recommendation 74 for the administrator of the content provider "B" to restrict access to the media content item "X", and the moderation notification 32c recommends an automatic moderation (e.g., automatically block access) 76 for the media content item "X".

Hence, the example of FIG. 5A enables the subscribed destination content providers "B" and "C" 12 to be automatically notified of moderated content, even before a user has uploaded the same or similar media content item to the content provider. The automatic notification enables the destination content provider (e.g., "B" or "C") 12 to moderate in step 72 of FIG. 2A the same media content item, based on the notification 32a or 32b, and according to the corresponding moderation policy of the destination content provider, in order to proactively moderate the media content item as it is supplied by the user to the destination content provider.

The processor circuit 22 of the moderation server 14 also can be configured for responding to queries 40 from a content provider 12 regarding a specified media content item 66 received by the content provider 12. If in step 58 the message received by the network interface circuit 20 of the moderation server 14 is not a moderation notification message 28, the processor circuit 22 determines in step 78 that the received message is a query 40 as to whether a specified media content item "Y" has been moderated (e.g., restricted, block, or approved) by another content provider 12.

Figure 5B:
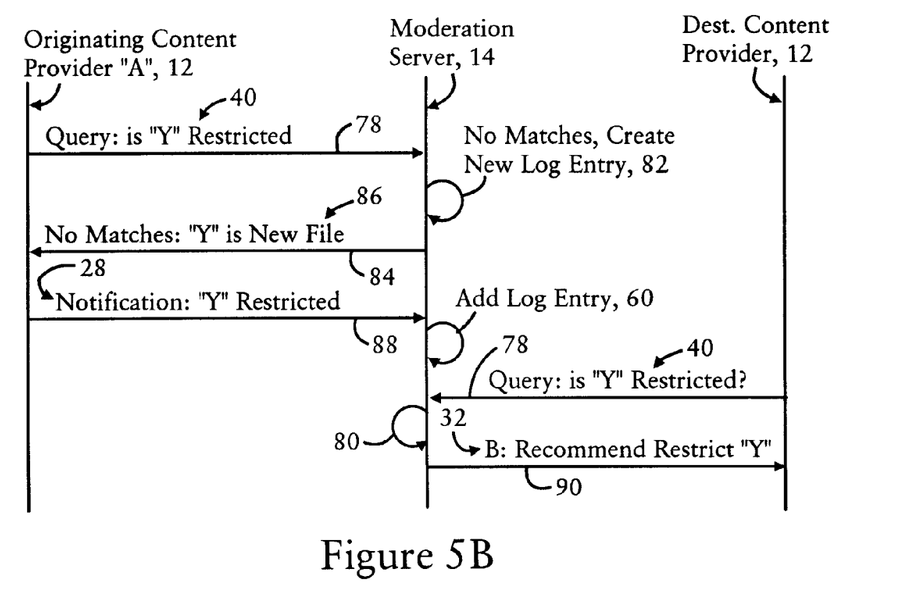

The processor circuit 22 is configured for comparing in step 80 the specified media content item "Y" with the moderation log entries 38 to determine whether there is a match with the same or a similar media content item identified in the moderation database 16. As described previously with respect to the notification message 28 of FIG. 4A and the moderation log entries 38 illustrated in FIGS. 3A and 3B, various techniques may be employed by the processor circuit 22 in determining a match, for example identifying matches within the metadata, pattern recognition of the media content, matches in the user identifiers, user device address, or network location address, etc. Assuming in step 80 the processor circuit 22 does not find any match, the processor circuit 22 in FIGS. 2B and 5B in step 82 generates a new log entry identifying the media content item (with no moderation activity). The processor circuit 22 generates and outputs in step 84 a response 86 that the media content item is a new media content item that has not been moderated (favorably or unfavorably). As illustrated in FIG. 5B, the originating content provider "A" also can send in step 88 a provider-initiated notification message 28 if the media content item "Y" is later moderated (e.g., restricted), causing the processor circuit 22 to create in step 60 a moderation log entry 38.

Assuming in step 80 of FIGS. 2A and 5B that the processor circuit 22 identifies a match between the media content item "Y" specified in the query 40 and a media content item "Z" identified in a moderation log entry 38, the processor circuit 22 can generate and output in step 90, via the network interface circuit 20, a notification 32. As illustrated with respect to FIG. 6, the notification 32 (e.g., 32a) can specify that the media content item "Y" has been moderated (e.g., restricted or approved) by a content provider 12 specified in the notification 32; alternately, the notification (e.g., 32b) can specify a moderation recommendation 74, generated by the processor circuit 22 based on a comparison between the respective moderation policies for the content provider 12 having generated the query and the originating content provider 12; the notification 32 also can specify a recommendation for automatic moderation 76, based on the processor circuit 22 determining that the destination content provider 12 having generated a query 40 follows the moderation policy of the originating content provider.

As described previously, the processor circuit 22 can generate the appropriate moderation notification 72 or recommendation 74/76 based on comparing the respective independent moderation policies 44 for the originating content providers 12 relative to the independent moderation policy 44 of the destination content provider 12 (e.g., based on any one of the moderation sensitivity 48 of the respective content providers 12, the rules 52 and/or trusted site list 50 of the destination content provider, or the moderation metadata 64 from the moderation log entries of the originating content providers). Hence, the processor circuit 22 can generate the moderation recommendation based on the respective independent moderation policies of the originating content providers (e.g., "D" and "E") relative to the destination content provider 12 having generated the query.

Hence, the notification message 32 output in step 90 enables the content provider 12 to moderate the media content item in step 72, as illustrated in FIGS. 2 and 5B, based on its independent moderation policy and the respective moderation policies and moderation activities by the other content providers 12 as reflected in the moderation log entries 38.

According to the example embodiments, an apparatus (e.g., a moderation server 14) enables moderation decisions to be shared between content providers, enabling a content provider to moderate the same or similar media content items according to its independent moderation policy and based on the moderation decisions of the other content providers. Hence, a content provider can implement a more efficient system for moderating media content items, while maintaining moderate the media content items according to its independent moderation policy.

While the example embodiments in the present disclosure have been described in connection with what is presently considered to be the best mode for carrying out the subject matter specified in the appended claims, it is to be understood that the example embodiments are only illustrative, and are not to restrict the subject matter specified in the appended claims.

What is claimed is:

1. A method comprising:

registering content providers, each content provider having a corresponding independent moderation policy configured for selectively providing network access to a media content item supplied by a user or blocking network access to the media content item from the corresponding content provider by a user device that has requested the media content item from the corresponding content provider;

receiving, from a first of the content providers, a first notification that a first media content item has been moderated by the first content provider, the first media content item having been uploaded to the first content provider by a user of the first content provider; and sending a second notification to at least a second of the content providers, the second notification identifying that the first content provider has moderated the first media content item, the second notification enabling the second content provider to moderate a copy of the first media content item, uploaded by a user of the second content provider to the second content provider distinct from the uploading to the first content provider, based on the second notification and according to the corresponding independent moderation policy of the second content provider, including enabling the second content provider to block access to the copy of the first media content item from the second content provider by a user device that requested the first media content item from the second content provider. by a user device that request the first media content item from the second content provider.

2. The method of claim 1, wherein:
the registering includes storing an attribute record for each content provider that is registered, the attribute record describing the corresponding independent moderation policy for the corresponding content provider;
the second notification including a moderation recommendation for the second content provider, the moderation recommendation generated based on a comparison between the respective independent moderation policies for the first content provider and the second content provider.

3. The method of claim 2, wherein the moderation recommendation recommends automatic moderation of the first media content item, based on the comparison identifying the independent moderation policy of the second content provider as following the independent moderation policy of the first content provider, enabling the second content provider to automatically moderate the copy of the first media content item.

4. The method of claim 2, further comprising receiving a third notification from a third of the content providers that the first media content item has been moderated by the third content provider, wherein the moderation recommendation identifies the moderating of the first media content item by the first content provider and the third content provider, the moderation recommendation based on the respective independent moderation policies for the first content provider, the second content provider, and the third content provider.

5. The method of claim 1, wherein the moderating of the first media content item by the first content provider includes at least one of restricting the network access or removing the network access to the first media content item.

6. The method of claim 1, wherein the second notification includes a moderation recommendation enabling the second content provider to automatically moderate the copy of the first media content item.

7. The method of claim 1, wherein the second notification is sent to the second content provider in response to receipt of the first notification.

8. The method of claim 1, further comprising creating a log entry specifying that the first content provider has moderated the first media content item, wherein the second notification is sent to the second content provider in response to receiving a query from the second content provider about the first media content item.

9. The method of claim 8, wherein the query includes a media content identifier, the method further comprising determining that the media content identifier in the query identifies a second media content item received by the second content provider and that matches the first media content item specified in the log entry.

10. The method of claim 1, wherein the first content provider is a first website service providing the network access to a first collection of media content items and the second content provider is a second website service providing the network access to a second collection of media content items, the first collection including the media content item supplied by the user.

11. An apparatus comprising:
a processor circuit configured for registering content providers into a database, each content provider having a corresponding independent moderation policy configured for selectively providing network access to a media content item supplied by a user or blocking network access to the media content item from the corresponding content provider by a user device that has requested the media content item from the corresponding content provider; and
a network interface circuit configured for receiving, from a first of the content providers via an Internet Protocol (IP) network, a first notification that a first media content item has been moderated by the first content provider, the first media content item having been uploaded to the first content provider by a user of the first content provider;
the processor circuit configured for generating a second notification for transmission by the network interface circuit to at least a second of the content providers, the second notification identifying that the first content provider has moderated the first media content item, the second notification enabling the second content provider to moderate a copy of the first media content item, uploaded by a user of the second content provider to the second content provider distinct from uploading to the first content provider, based on the second notification and according to the corresponding independent moderation policy of the second content provider, including enabling the second content provider to block access to the copy of the first media content item from the second content provider by a user device that requested the first media content item from the second content provider.

12. The apparatus of claim 11, wherein:
the processor circuit is configured for registering the content providers based on storing an attribute record for each content provider that is registered, the attribute record describing the corresponding independent moderation policy for the corresponding content provider;
the second notification generated by the processor circuit including a moderation recommendation for the second content provider, the moderation recommendation generated by the processor circuit based on a comparison by the processor circuit between the respective independent moderation policies for the first content provider and the second content provider.

13. The apparatus of claim 12, wherein the moderation recommendation generated by the processor circuit recommends automatic moderation of the first media content item, based on the comparison by the processor circuit identifying the independent moderation policy of the second content provider as following the independent moderation policy of the first content provider, enabling the second content provider to automatically moderate the copy of the first media content item.

14. The apparatus of claim 12, wherein the network interface circuit is configured for receiving a third notification from a third of the content providers that the first media content item has been moderated by the third content provider, wherein the moderation recommendation generated by the processor circuit identifies the moderating of the first media content item by the first content provider and the third content provider, the moderation recommendation based on the respective independent moderation policies for the first content provider, the second content provider, and the third content provider.

15. The apparatus of claim 11, wherein the moderating of the first media content item by the first content provider includes at least one of restricting the network access or removing the network access to the first media content item.

16. The apparatus of claim 11, wherein the second notification includes a moderation recommendation enabling the second content provider to automatically moderate the copy of the first media content item.

17. The apparatus of claim 11, wherein the processor circuit is configured for generating the second notification, for transmission to the second content provider, in response to receipt of the first notification.

18. The apparatus of claim 11, wherein the processor circuit is configured for creating a log entry specifying that the first content provider has moderated the first media content item, wherein the processor circuit is configured for generating the second notification for the second content provider in response to receiving a query from the second content provider about the first media content item.

19. The apparatus of claim 18, wherein the query includes a media content identifier, the processor circuit configured for determining that the media content identifier in the query identifies a second media content item received by the second content provider and that matches the first media content item specified in the log entry.

20. The apparatus of claim 11, wherein the first content provider is a first website service providing the network access to a first collection of media content items and the second content provider is a second website service providing the network access to a second collection of media content items, the first collection including the media content item supplied by the user.

21. Logic encoded in one or more non-transitory tangible media for execution and when executed operable for:
  registering content providers, each content provider having a corresponding independent moderation policy configured for selectively providing network access to a media content item supplied by a user or blocking network access to the media content item from the corresponding content provider by a user device that has requested the media content item from the corresponding content provider;
  receiving, from a first of the content providers, a first notification that a first media content item has been moderated by the first content provider, the first media content item having been uploaded to the first content provider by a user of the first content provider; and
  sending a second notification to at least a second of the content providers, the second notification identifying that the first content provider has moderated the first media content item, the second notification enabling the second content provider to moderate a copy of the first media content item, uploaded by a user of the second content provider to the second content provider distinct from the uploading to the first content provider, based on the second notification and according to the corresponding independent moderation policy of the second content provider, including enabling the second content provider to block access to the copy of the first media content item from the second content provider by a user device that requested the first media content item from the second content provider.

22. An apparatus comprising:
  means for registering content providers into a database, each content provider having a corresponding independent moderation policy configured for selectively providing network access to a media content item supplied by a user or blocking network access to the media content item from the corresponding content provider by a user device that has requested the media content item from the corresponding content provider; and
  a network interface circuit configured for receiving, from a first of the content providers via an Internet Protocol (IP) network, a first notification that a first media content item has been moderated by the first content provider, the first media content item having been uploaded to the first content provider by a user of the first content provider;
  the means for registering configured for generating a second notification for transmission by the network interface circuit to at least a second of the content providers, the second notification identifying that the first content provider has moderated the first media content item, the second notification enabling the second content provider to moderate a copy of the first media content item, uploaded by a user of the second content provider to the second content provider distinct from the uploading to the first content provider, based on the second notification and according to the corresponding independent moderation policy of the second content provider, including enabling the second content provider to block access to the copy of the first media content item from the second content provider by a user device that requested the first media content item from the second content provider.

* * * * *